United States Patent
Holler et al.

(10) Patent No.: US 10,481,931 B2
(45) Date of Patent: Nov. 19, 2019

(54) MODIFYING AND SIMULATING THE OPERATING SOFTWARE OF A TECHNICAL SYSTEM

(71) Applicant: dSPACE digital signal processing and control engineering GmbH, Paderborn (DE)

(72) Inventors: Dominik Holler, Schlangen (DE); Nicolas Amringer, Paderborn (DE); Robert Leinfellner, Paderborn (DE); Ulrich Kiffmeier, Harsewinkel (DE)

(73) Assignee: DSPACE DIGITAL SIGNAL PROCESSING AND CONTROL ENGINEERING GMBH, Paderborn (DE)

( * ) Notice: Subject to any disclaimer, the term of this patent is extended or adjusted under 35 U.S.C. 154(b) by 197 days.

(21) Appl. No.: 15/679,448

(22) Filed: Aug. 17, 2017

(65) Prior Publication Data

US 2018/0052698 A1  Feb. 22, 2018

(30) Foreign Application Priority Data

Aug. 18, 2016 (EP) .................................. 16184654

(51) Int. Cl.
*G06F 9/455* (2018.01)
*G06F 9/48* (2006.01)

(52) U.S. Cl.
CPC ...... *G06F 9/45508* (2013.01); *G06F 9/45533* (2013.01); *G06F 9/4843* (2013.01); *G06F 2009/45562* (2013.01)

(58) Field of Classification Search
CPC .................................................. G06F 9/45508
See application file for complete search history.

(56) References Cited

PUBLICATIONS

Shirner et al., System-level Development of Embedded Software, IEEE (Year: 2010).*
Communication pursuant to Article 94(3) EPC for Eurpoean Application No. 16184654.8, dated Sep. 10, 2018.
Extended European search report concerning patent application 161846548, dated Mar. 6, 2017.
Jakob Mauss, Matthias Simons. Chip simulation of automotive ECUs. 9. Symposium Steuemngssysteme für automobile Antriebe, Sep. 20-21, 2012, Berlin.

(Continued)

*Primary Examiner* — Charlie Sun
(74) *Attorney, Agent, or Firm* — Orrick, Herrington & Sutcliffe LLP; Joseph A. Calvaruso

(57) ABSTRACT

According to the invention, the operating software 10 of a technical system, particularly of a controller for controlling or regulating at least one technical device, is modified by virtue of hardware-dependent software components in the operating software 10 executable directly on the technical system not being executed and instead the functional behavior of the hardware-dependent software components being recreated by substitute functions 23. To this end, the hardware-dependent software components are automatically identified (step S1), and the substitute functions 23 are automatically ascertained or produced. On execution in a suitable simulation environment 200 (step S3), the operating software 20 modified in this way simulates the technical system independently of the real hardware 100 thereof.

13 Claims, 3 Drawing Sheets

(56) References Cited

PUBLICATIONS

Jakob Mauss. Chip simulation used to run automotive software on PC. ERTS 2014—Embedded Real Time Software and Systems, Toulouse, France, Feb. 5-7, 2014.
Oracle Corporation. Migrate Windows—Oracle VM VirtualBox, Sep. 7, 2015.

* cited by examiner

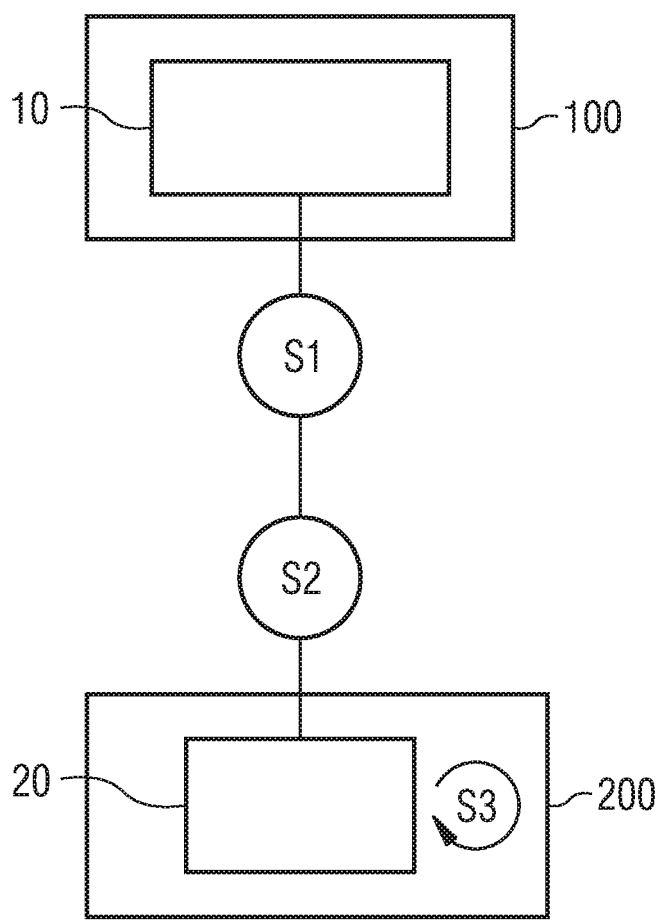

MODIFYING AND SIMULATING THE OPERATING SOFTWARE OF A TECHNICAL SYSTEM

CROSS REFERENCE TO RELATED APPLICATIONS

This application claims the benefit of European patent application no. 16184654.8, filed on Aug. 18, 2016, the entire contents of which are hereby incorporated by reference in its entirety.

BACKGROUND OF THE INVENTION

The present invention relates to a method for modifying the operating software of a technical system and to a correspondingly modified operating software. Further, the invention relates to the simulation of the operating software and to a corresponding simulation environment. In particular, the invention relates to the modification and simulation of the operating software of a controller ("electronic control unit", ECU) that controls or regulates other technical devices, for example vehicle motors or the like.

The computer-aided developing and testing of technical systems and the operating software thereof frequently involves a real, technical system being recreated by a virtual system and simulated as a software model in a suitable development and simulation environment. Such a software model can be used to model both the operating software of the technical system and the hardware thereof. The software models of controllers are usually referred to as a "virtual controller" or "virtual electronic control unit" (virtual ECU). During testing of a controller, the operating software source code, for example, is translated (compiled) for a defined simulation environment, simulated therein, tested and if need be developed further.

The simulation of a technical system or controller based on individually compiled operating software can be problematic, however, because hardware-dependent technical effects that arise from the interaction between the operating software and the hardware of the technical system are generally not recreated with sufficient precision by the operating software translated for the simulation environment. The result is undesirable discrepancies between the behavior of the real system and the simulation thereof. Such effects result, by way of example, from the individual properties of the relevant microcontrollers or processors and the specific instruction sets thereof. Microcontrollers, comprising at least one processor and additional peripherals, are frequently a central part of technical systems to be simulated, particularly in the area of embedded systems, such as controllers. The peripherals of the microcontroller also cause further difficulties, because their technical interactions with the operating software cannot readily be simulated. Additionally, in practice the operating software is often unavailable as source code, which means that an alternative to the simulation approach outlined above is needed.

An alternative that is less suitable for reasons of cost is complete removal of all hardware-dependent software components from the operating software and subsequent recreation of the hardware interactions with another, preferably standardized and similar hardware, or by "rapid control prototyping" (RCP). This is complex and costly, however, particularly with regard to the correct interaction between such circumvention solutions and the amended operating software. Other approaches are aimed at circumventing the execution of individual hardware-dependent functions and providing the functionality thereof elsewhere. This approach also requires the manual intervention of development engineers with specialized knowledge both of the relevant hardware and of the hardware-dependent software components of the operating software. To date, fully automated approaches have failed at simply identifying the hardware-dependent software components of the operating software fully and correctly. Similarly, solutions based on simulations or emulations of the hardware also fail for reasons of technical complexity and the associated costs, since the simulation or emulation environments place very high demands on computation power.

BRIEF SUMMARY OF THE INVENTION

In this respect, the object of the present invention is to provide a simple and inexpensive way of simulating the operating software of a technical system and the hardware-dependent software components thereof.

This object is achieved by a method for modifying operating software and for simulating a technical system using the modified operating software, and by a simulation environment and modified operating software.

According to the invention, those software components in a provided operating software of a technical system, whose execution is dependent on the hardware of the relevant technical system, are first automatically identified. The automatic identification relates to such software components as interact with the hardware of the technical system to be simulated. For the identified, hardware-dependent software components, specific substitute functions are subsequently ascertained, the execution of which requires no interaction with the hardware of the technical system. The substitute functions are independent of the real hardware of the technical system and can be executed in a simulation environment. The hardware-dependent software components are then replaced in the operating software by the relevant hardware-independent substitute functions such that firstly, the hardware-dependent software components exhibit no further action, and secondly, the substitute functions recreate as precisely as possible the technical effects required by the operating software from the hardware-dependent software components. The result is that the technical system is simulated by execution of the modified operating software in a suitable simulation environment independently of the hardware thereof.

Replacement of the hardware-dependent software components such that they exhibit no further action in the modified operating software can be achieved firstly by virtue of the hardware-dependent software components being replaced fully by the relevant substitute functions. In this case, no further hardware-dependent software components are left in the modified operating software, and the substitute functions replace them in the modified operating software on practically a one-to-one basis. Secondly—and as a preference—it is also possible for only calls, called functions and/or interface implementations of the hardware-dependent software components to be changed such that the substitute functions are called in the modified operating software instead of parts of the hardware-dependent software components. In this case, the binary code of the hardware-dependent software components remains in the modified operating software at least in part, while hardware-independent functions call the substitute functions by means of the accordingly changed functions, calls and/or interface implementations in the modified operating software.

The inventive modification of the operating software takes place in automated fashion at least insofar as the hardware-dependent software components are identified without manual interaction. Preferably, in addition, the hardware-independent substitute functions are produced or ascertained automatically and the hardware-dependent software components are automatically replaced by the substitute functions.

The operating software is executable directly on the technical system, i.e., it is in an executable binary code or the like. The hardware-dependent software components of the operating software access the hardware of the technical system directly, for example the microcontroller of a controller and, in this case, generally the peripherals of the microcontroller. In particular, this access can be effected directly on registers of the peripherals of the microcontroller in machine language by utilizing the instruction set.

Preferably, the operating software to be modified in accordance with the invention is installed on an electronic controller (ECU) that controls and/or regulates other technical systems within a vehicle. The hardware-dependent software components of the operating software interact with a microcontroller that is on the controller and with the peripherals of said microcontroller, and if need be with further hardware components. In this respect, the operating software comprises multiple software layers based on one another, for example an application layer, a service layer ("middleware"), an operating system and/or a hardware abstraction layer. Specific examples of service and hardware abstraction layers are the runtime environment (RTE) and the hardware-dependent basic software layer ("microcontroller abstraction layer", MCAL) in accordance with the AUTOSAR standard. In accordance with the invention, the hardware-dependent software components available in the hardware-dependent basic software layer are replaced by hardware-independent substitute functions.

A corresponding simulation environment comprises a simulator of the relevant technical system or controller that is suitable for executing the operating software modified in accordance with the invention and thereby simulating the technical system or controller without accessing the hardware thereof. In accordance with a simulation method in accordance with the invention, the relevant technical system or controller is simulated by executing the operating software modified in accordance with the invention in the simulation environment.

Instead of the hardware-dependent software components, the functionally equivalent substitute functions are executed in the simulation environment. These can either be integrated as integral parts into the modified operating software or, as a preference, can be outside the modified operating software in a form executable directly by the simulation environment, with the functionally equivalent substititute functions returning both results and return values to the respective calling functions within the modified operating software. In this case, the substitute functions are, by way of example, in a function library with substitute functions or in supplementary functional modules with substitute functions that are called as soon as the hardware-independent component of the operating software needs the functionality of a hardware-dependent software component and said functionality is provided via the modified components of the operating software.

As already mentioned, the operating software is preferably available as binary code that is interpretable or executable directly by the technical system or the microcontroller of a controller. The hardware-dependent software components are identified therein preferably by interface specifications that specify at least those binary interfaces via which the hardware-dependent software components to be replaced are called. From the interface specifications, it is possible to deduce binary code patterns, particularly also automatically, that are specific to the hardware-dependent software components of the technical system and denote the relevant binary interfaces. Using mapping rules, the implementations of the hardware-dependent software components that are behind the binary code patterns can be found automatically in the operating software to be modified. The interface specifications may be proprietary, but they preferably comply with a relevant industrial standard, for example the AUTOSAR standard in the area of the automotive industry.

The interface specifications are used for producing the implementation of the binary interfaces when the source code of the operating software is translated into the binary code. At the level of the source code, the interface specifications describe interfaces for application programming. Known as programming interfaces, application programming interfaces, or APIs, such tools provide access to the hardware-dependent software components. The programming interfaces correspond at the level of the binary code to the binary interfaces between hardware-independent and hardware-dependent software components. By determining the relevant binary code patterns in the binary code of the operating software, the hardware-dependent software components are identified in automated fashion.

Preferably, the binary code of the operating software is organized or translated so that it comprises a separate interface layer in which the hardware-dependent software components of the operating software are present. This separate interface layer is the only layer of the operating software, which is dependent on the hardware of the technical system. The interface layer comprises both (i) the binary interfaces via which hardware-dependent software components can be called from other layers of the operating software and (ii) the hardware-dependent software components themselves. The basis for providing such an interface layer may in turn be a standard, for example the AUTOSAR standard.

The step of replacing the identified hardware-dependent software components with suitable substitute functions preferably involves only the interface layer being modified, and all other parts of the operating software can remain unchanged. Instead of modification of individual hardware-dependent software components and/or the binary interface implementations thereof, it is also possible for the entire interface layer to be replaced by a substitute interface layer or substitute layer that, on execution of the modified operating software, provides, within the simulation environment, a functionality that comprises function calls to the substitute functions or the full functionality of the interface layer, instead of the hardware-dependent software components.

The hardware-dependent software components are replaced by determining such substitute functions so as to recreate the functionalities of the hardware-dependent software components on execution in the simulation environment. In this respect, the applicable function calls replace, in the substitute layer, the calls to the hardware-dependent software components in the interface layer or the relevant binary interface implementations.

In accordance with a preferred embodiment of the invention, the substitute functions are ascertained based on the aforementioned interface specifications and/or mapping rules. The latter represent essentially functional descriptions of the hardware-dependent software components and/or of the relevant binary interfaces that are used for the translation or production of the binary code of the operating software from the source code. In this respect, the mapping rules also specify the functionality of the substitute functions. The functional descriptions are used in order to recreate the functionalities of the hardware-dependent software components by means of a simulation environment. For example, this can be effected using an instruction set simulator of the simulation environment, which recreates the instruction set of the processor or microcontroller of the technical system or controller.

The substitute functions are preferably organized in substitute function libraries that are supported by the simulation environment used and to whose substitute functions the function calls in the substitute layer refer. In this case, modification of the operating software consists essentially in equipping the substitute layer with function calls to suitable substitute functions or providing the binary interface implementation with applicable function calls. Therefore, the substitute functions are available either as binary code, for example when they are integrated into the substitute layer, or in a format executable elsewhere by the simulation environment.

BRIEF DESCRIPTION OF THE DRAWINGS

Further features and advantages of the invention will be obtained from the description below of exemplary embodiments in accordance with the invention and further alternative embodiments in connection with the drawings that follow, in which:

FIG. 1 shows a flowchart for the method in accordance with the invention;

DETAILED DESCRIPTION OF THE INVENTION

Figure 2A:
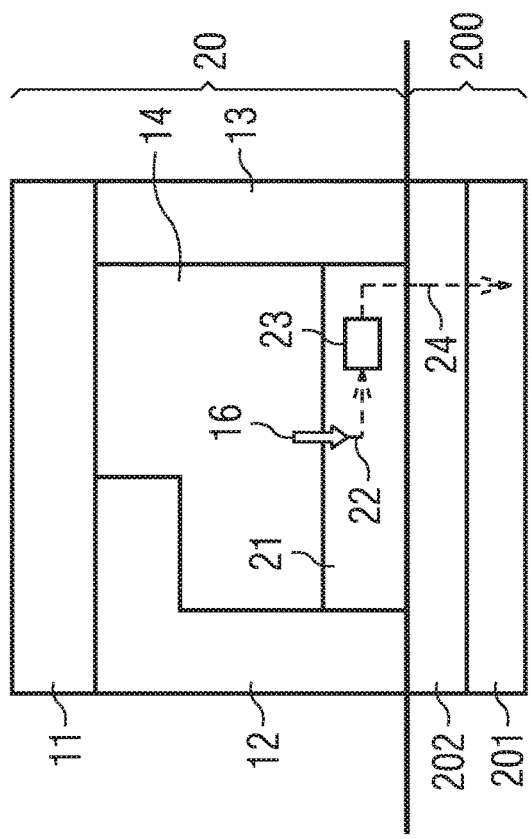
FIG. 2 shows the design of operating software (FIG. 2a) and the design of operating software modified in accordance with the invention (FIG. 2b)

FIG. 2a schematically shows the design of operating software 10 of a controller (not portrayed), which is executable on the microcontroller 100 of the controller. The operating software 10 is available in the form of a binary code, for example in machine language, and is capable of running on the controller or the microcontroller 100 thereof directly.

The operating software 10 comprises multiple components and layers, including the hardware-dependent layer 15, which provides the hardware-independent components of the operating software 10 with accesses to the hardware of the controller, that is to say to the peripherals of the microcontroller 100, for example. Hardware-independent components of the operating software 10 are particularly in the application layer 11, which is normally created by application engineers and provides essential functionalities of the operating software. The application layer 11 interacts, if need be via a suitable runtime environment (not depicted), with the underlying components and layers of the operating software 10 that are closer to the hardware. In connection with the AUTOSAR standard, an AUTOSAR runtime environment, for example, provides mediation between the application layer 11 and the underlying standard-compliant layers 12, 13, 14.

While the operating system components 12 and driver components 13 have direct access to the microcontroller 100, hardware-dependent access operations from the abstraction layer 14 are executed via the interface layer 15. The abstraction layer 14 provides controller-specific functionalities that access the microcontroller 100 of the controller by virtue of standardized interfaces 16 being used to address hardware-dependent functions 17 that perform the actual hardware access 18 to the microcontroller 100. The interfaces 16 between the hardware-independent components of the operating software 10 in the abstraction layer 14 and the hardware-dependent components of the operating software 10 in the interface layer 15 are binary interfaces ("application binary interfaces", ABI), these being able to be deduced using specifications. These specifications describing hardware and/or software can comply with a standard.

FIG. 1 illustrates the method in accordance with the invention for modifying the operating software 10 as depicted in FIG. 2a, which is based on the microcontroller 100 of the controller, with modified operating software 20, executable in a simulation environment 200, that is independent of the hardware of the controller and of the microcontroller 100. In this case, first of all the hardware-dependent software components or functions 17 of the operating software 10 are ascertained (step S1) and subsequently replaced by functionally equivalent substitute functions 23 (step S2) such that finally the functional behavior of the operating software 10 can be reproduced by simulating the modified operating software 20 in the simulation environment 200 (step S3). Steps S1 and S2 as depicted in FIG. 1 cause the transition from the operating software 10 as depicted in FIG. 2a to the modified operating software 20 as depicted in FIG. 2b.

Figure 2B:
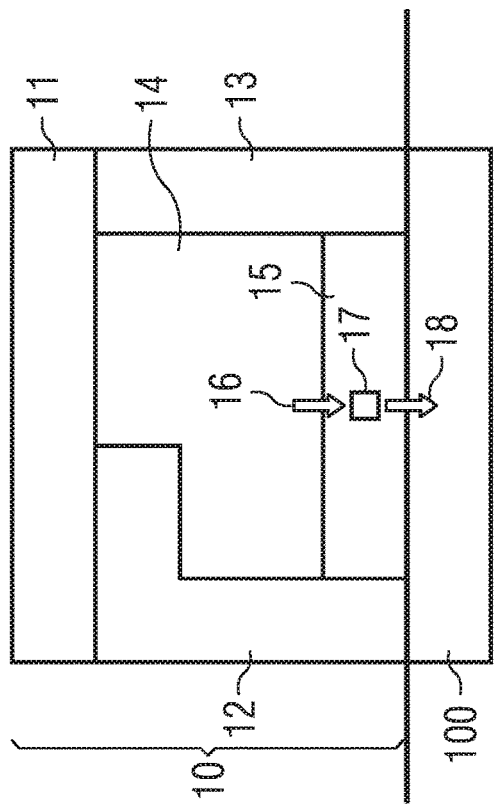

FIG. 2b illustrates the modified operating software 20 in the simulation environment 200. The simulation environment 200 comprises the actual simulator 201, which implements the required functionalities of the hardware-dependent software components, and an instruction set simulator 202. When the operating software 10 is modified in accordance with steps S1 and S2, the interface layer 15 is transformed using the hardware-dependent functions 17 into an interface layer 21 that is independent of the real hardware and whose hardware-independent substitute functions 23 provide the functionality of the hardware-dependent functions 17. The new, hardware-independent interface layer 21 thus replaces the original, hardware-dependent interface layer 15, which is why the former is also referred to as "substitute interface layer" or simply "substitute layer" in the present context. All of the functionalities of the substitute interface layer 21 and the technical effects thereof are largely independent of the microcontroller 100, and the peripherals thereof, since said substitute interface layer interacts with the simulation environment 200 instead. The dependency on the instruction set of a particular processor architecture or a specific processor can be taken into consideration for the simulation from the choice of a suitable instruction set simulator 202.

The functionalities and effects simulated by the substitute functions 23 in this manner for the hardware-dependent functions 17 are transparent to the further hardware-independent components of the modified operating software 20, for example to the abstraction layer 14, since interfaces, transfer parameters and return values of the substitute functions 23 are identical to or at least compatible with those of the applicable hardware-dependent functions 17. In particular, the binary interfaces 16 of the modified operating software 20 as depicted in FIG. 2b can be used in the same way as those of the unmodified operating software 10 as depicted in FIG. 2a.

In the case of the modified operating software 20, the binary interfaces 16 are used to execute function calls 22 that refer to the substitute functions 23 that then perform access operations 24 in the simulation environment 200. In this respect, the substitute interface layer 21 recreates the functional behavior of the hardware-dependent interface layer 15 such that the hardware access operations 18 of the operating software 10 on the microcontroller 100, including the peripherals thereof, are replaced by simulator access operations 24 on the simulator 201, so that the demanded functional behavior of the hardware-dependent software components is recreated by the relevant substitute functions 23.

To this end, in accordance with step S1, the hardware-dependent software components or functions 17 are first of all located automatically, that is to say without manual interaction by an operator, in the interface layer 15 in order to subsequently replace them with functionally equivalent hardware-independent substitute functions 23 in accordance with step S2. The substitute functions 23 are integrated into the substitute interface layer 21 by means of the function calls 22 and simulator access operations 24 such that hardware-independent functions, for example from the abstraction layer 14, can use the functionalities of the substitute functions 23 in unaltered fashion via the binary interface 16.

The hardware-dependent functions 17 are identified on the basis of binary code patterns in the exemplary embodiments as depicted in FIG. 2, said binary code patterns referring to the binary interfaces 16 in the binary code of the operating software 10 or being part of the implementation of the binary interfaces 16. These binary code patterns arise from interface specifications in accordance with the AUTOSAR standard or other relevant standards that prescribe programming interfaces (API) at the source code level for programming hardware-dependent functions 17 that can be used to deduce the associated binary interfaces 16. In connection with the exemplary embodiment as depicted in FIG. 3, this is explained in more detail.

The binary code patterns within the binary code of the operating software 10 are comparable, based on a higher-level programming language, to function signatures. They are ascertained on the basis of the interface specifications, that is to say on the basis of formal descriptions of the binary interfaces 16 in the interface layer 15, for example in the form of UML ("unified modeling language") models or the like. In this respect, the binary code patterns act, during identification of the hardware-dependent software components (step S1), as search patterns for a pattern matching process in the binary code of the operating software 10. In this case, the interface specifications provide references to the call for hardware-dependent software components 17 in the binary code via the relevant binary interfaces 16. Insofar as the interface specifications are not known on the basis of a standard, they can also be provided in the form of manually created and then reusable configuration files.

The hardware-dependent functions 17 are replaced in step S2 by substitute functions 23 by using functional descriptions of the hardware-dependent functions 17 to be replaced. The functional descriptions are used to automatically ascertain or produce the functionally equivalent substitute functions 23. In this case, the functional descriptions are part of mapping rules that map hardware-dependent functions 17 onto substitute functions 23. The substitute functions 23 then replace the hardware-dependent functions 17 in the substitute interface layer 21 or are integrated into the latter. In the latter case, the hardware-dependent functions 17 may indeed still be available in the modified operating software, but are no longer called therein, since in the modified operating software 20 a call via the binary interface 16 is deflected to the substitute function 23 by the function call 22.

Figure 3:
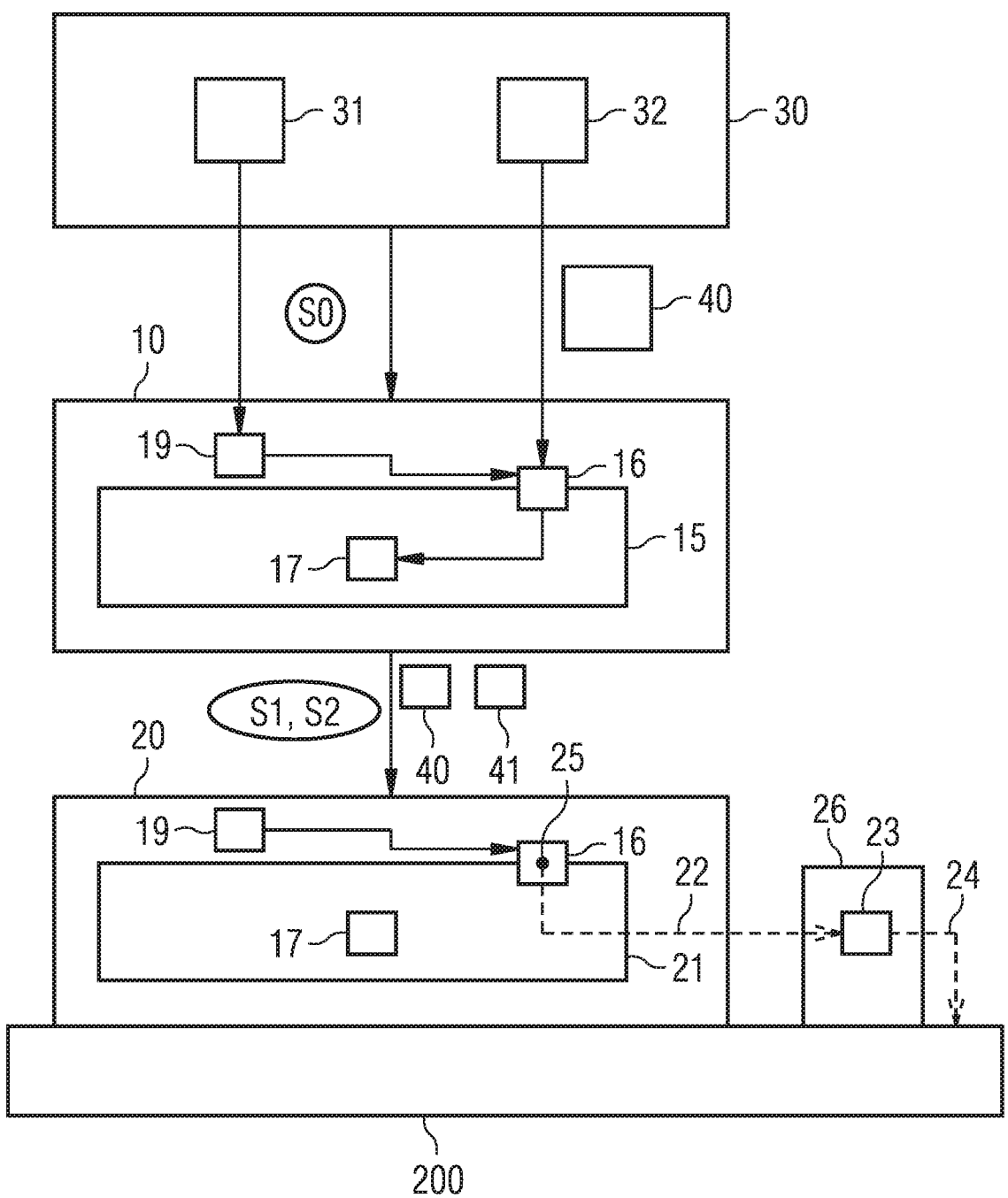
FIG. 3 shows a further embodiment of the invention.

The embodiment as depicted in FIG. 3 illustrates the invention once again against the background of the connection between the source code 30 and binary code of the operating software 10 and the modified operating software 20, which is likewise present in the form of an executable code. As depicted in FIG. 3, the source code 30 is initially translated into the binary code 10 (compiled) in a step S0 that precedes steps S1 and S2. This involves a hardware-independent function 31 that is present in the source code 30 and that, when executed via a provided programming interface 32, requests an interaction with the microcontroller 100 being translated into a hardware-independent binary function 19. Further, in the binary code 10, the interface layer 15 is formed using the binary interface 16 and the hardware-independent binary function 17.

In this case, the implementation of the binary interface 16 is produced starting from the programming interface 32 and an AUTOSAR interface specification 40, from which, inter alia, the configuration of the binary interface 16 and of the binary code patterns included therein are deducible, these being used in step S1 for identifying hardware-dependent functions 17 in the binary code 10. The interface specification 40 represents a functional description of the programming interface 32, from which the translation step S0 produces a binary interface description in the form of the binary interface 16 and the relevant binary code patterns. In addition, the interface specification 40 specifies the functions that can be called in the source code 30 and indicates whether they are hardware-dependent, such as the hardware-dependent functions 17, for example, or hardware-independent.

During production of the modified operating software 20, the interface specification 40 is used in order to identify the hardware-dependent functions 17 in the binary code of the operating software 10 in line with step S1. In addition, as depicted in the exemplary embodiment of FIG. 3, mapping rules 41 are also used, for example in the form of map files. The mapping rules 41 are used in connection with step S2 in order to assign to the identified hardware-dependent functions 17 those substitute functions 23 which, on execution in the simulation environment 200, provide a functionality that is equivalent to the functionality that results in the relevant hardware-dependent function 17 in interaction with the hardware of the microcontroller 100.

To this end, the mapping rules 41 comprise functional descriptions of the hardware-dependent function 17 to be replaced, on the basis of which suitable substitute functions 23 are ascertained or produced. In the latter case, the functionality of the hardware-dependent function 17 to be replaced is recreated starting from the functional description in the simulation environment 200, if need be with the instruction set simulator 202. The mapping rules 41 can furthermore also be used for identifying the hardware-dependent functions in the binary code 10, since with the functional description they also produce associations between the functions used in the source code 30 and the hardware-dependent functions 17 that are present in the binary code.

Unlike in the case of the embodiment as depicted in FIG. 2b, the substitute functions 23 in the case of the embodiment as depicted in FIG. 3 are not integrated into the substitute interface layer 21, rather only function calls 22 are integrated into the relevant implementation of the binary interfaces 16 that bypass the available hardware-dependent functions 17 and, instead, refer to the substitute functions 23. The hardware-dependent binary functions 17 are functionless, because they can no longer be addressed via the binary interface 16. The substitute functions 23 are present outside the substitute interface layer 21 in a functional library 26 and eventually interact with the simulation environment 200 via the simulator access operations 24.

The implementations of the binary interfaces 16 are modified in the course of replacement of the hardware-dependent functions 17 such that they call the substitute functions 23, that is to say are provided with applicable function calls 22, with the binary interfaces 16 remaining unaltered, particularly in comparison with higher layers.

What is claimed is:

1. A method for modifying operating software of a technical system, particularly of a controller for controlling or regulating at least one technical device, comprising the step of providing the operating software executable directly on the technical system, characterized by the further steps of:
   automatically identifying software components of the operating software whose execution is dependent on the hardware of the technical system; and
   replacing the identified, hardware-dependent software components with substitute functions whose execution is independent of the hardware of the technical system,
   wherein the operating software modified in this manner simulates the technical system on execution on a simulation environment independently of the hardware of the technical system,
   wherein the operating software is provided in the form of a binary code executable on the technical system, and the hardware-dependent software components in the binary code of the operating software are identified by using interface specifications, and
   wherein the interface specifications specify binary code patterns that are specific to the hardware of the technical system.

2. The method of claim 1, wherein translating a source code of the operating software into the binary code by means of the interface specifications involves implementations of binary interfaces being produced that form accesses to the hardware-dependent software components in the operating software, and the binary code patterns are deduced from the binary interfaces and/or the implementations of the binary interfaces.

3. The method of claim 1, wherein the operating software comprises an interface layer that is dependent on the hardware of the technical system and that form accesses to the hardware-dependent software components in the operating software, wherein the hardware-dependent interface layer is replaced by a substitute interface layer that comprises function calls to the substitute functions.

4. The method of claim 3, wherein the substitute functions are ascertained automatically such that executing the substitute functions on the simulation environment involves a functionality of the hardware-dependent software components being simulated, and the substitute interface layer is equipped with function calls for executing the ascertained substitute functions.

5. The method of claim 3, wherein the substitute functions are ascertained by using mapping rules and are associated with the hardware-dependent software components such that executing the substitute functions on the simulation environment involves a functionality of the hardware-dependent software components being simulated, and the substitute interface layer is equipped with function calls for executing the ascertained substitute functions.

6. The method of claim 5, wherein ascertaining the substitute functions by using the mapping rules involves a functional description of the hardware-dependent software components being taken into consideration that is used to recreate a functionality of the hardware-dependent software components by means of an instruction set simulator of the simulation environment that simulates the instruction set of a processor of the technical system.

7. The method of claim 3, wherein the substitute interface layer comprises the implementation of the binary interfaces, and the function calls are integrated into the implementation of the binary interfaces such that the software components of the operating software that are outside the substitute interface layer can call the substitute functions, particularly by means of the substitute interface layer.

8. The method of claim 1, wherein the interface specifications and/or the interface layer comply with a standard, preferably the AUTOSAR standard.

9. The method of claim 1, wherein the hardware-dependent software components are replaced by substitute functions that are outside the operating software and are executed by the simulation environment, independently of the operating software.

10. The method of claim 1, wherein the hardware-dependent software components are replaced by substitute functions in the form of binary code and/or in the form of a code executable by the simulation environment.

11. A method for simulating a technical system on a simulation environment, particularly for simulating a controller for controlling or regulating at least one technical device, wherein the operating software of the technical system is modified using a method of claim 1 and the modified operating software is executed on the simulation environment such that the technical system is simulated.

12. A simulation environment, comprising a simulator of a technical system, particularly of a controller for controlling or regulating at least one technical device, wherein the simulator comprises at least one processor and wherein the at least one processor is configured and set up to execute operating software of the technical system modified using a method of claim 1 such that the technical system is simulated.

13. A non-transitory computer-readable storage medium including modified operating software of a technical system, particularly of a controller for controlling or regulating at least one technical device, that is modified using a method of claim 1 such that, on execution on the simulation environment, it simulates the technical system.

* * * * *